Figure 2:
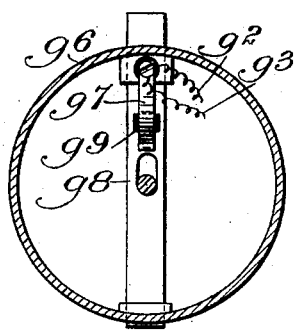

No. 763,575. PATENTED JUNE 28, 1904.
C. H. VIGGARS.
SOUND COLLECTING AND MAGNIFYING DEVICE.
APPLICATION FILED MAY 11, 1903.
NO MODEL.

Witnesses:
Jas. J. Maloney
Nancy P. Ford

Inventor:
Charles H. Viggars
by J. P. and S. J. Livermore
Attys.

No. 763,575. Patented June 28, 1904.

UNITED STATES PATENT OFFICE.

CHARLES H. VIGGARS, OF MILTON, MASSACHUSETTS, ASSIGNOR TO CHARLES BATE, OF BROCKVILLE, CANADA.

SOUND COLLECTING AND MAGNIFYING DEVICE.

SPECIFICATION forming part of Letters Patent No. 763,575, dated June 28, 1904.

Application filed May 11, 1903. Serial No. 156,635. (No model.)

*To all whom it may concern:*

Be it known that I, CHARLES H. VIGGARS, of Milton, county of Norfolk, and State of Massachusetts, have invented an Improvement in Sound Collecting and Magnifying Devices, of which the following description, in connection with the accompanying drawings, is a specification, like letters on the drawings representing like parts.

The present invention relates to a sound-transmitting device and is embodied in a device of this kind intended to collect and magnify the sounds transmitted as an assistance to the deaf, the object of the invention being to obtain an instrument which will largely magnify the sound and at the same time be convenient to carry and use and unobtrusive in appearance.

The instrument embodying the invention comprises a microphone-transmitter, which is contained in a case provided with a sound-collecting device like a small megaphone, which conveys the sounds to the transmitter-diaphragm, and a receiver having electrical connection with the transmitter, the said receiver being shown as detachable from the transmitter part of the instrument, being connected therewith by a cord-circuit and a plug like the plug ordinarily used in telephone-switchboards. The receiver can therefore be readily detached from the transmitting part of the instrument when the instrument is not in use, the circuits then being broken so that the battery-current is not wasted, the battery being contained in the transmitter part of the instrument and readily removable therefrom for recharging or replacing.

In accordance with the invention the megaphone and its transmitter attachment are contained in a cylindrical casing which is of convenient size, the actual device being only about one-third larger than the scale to which it is drawn, so that it is convenient to handle and not particularly noticeable when in use. As herein shown, the casing is made of metal with a suitable covering and is provided with a detachable cover at the end where the battery is inserted, so that the said battery can be removed when exhausted. An ordinary dry battery can be used and the metal casing employed as one of the conductors, the transmitter, which is also within the casing, being connected into circuit by means of a plug connected with the conductors leading to the receiver. In order that the battery may be cut out of circuit without disconnecting the plug from the transmitter part when the transmitter is temporarily out of use and it is not desired to disconnect the receiver therefrom, the said receiver is herein shown as provided with a circuit-controlling switch so situated as to be conveniently accessible to the user of the device.

Figure 1:
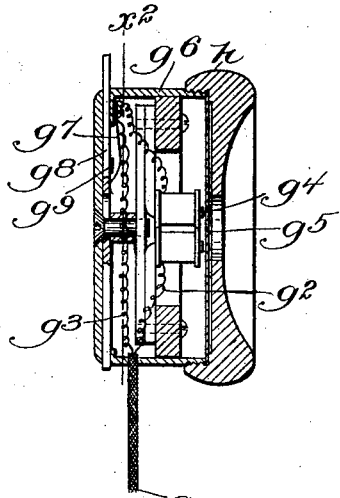
Figure 3:
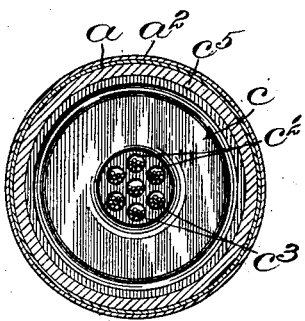
Figure 4:
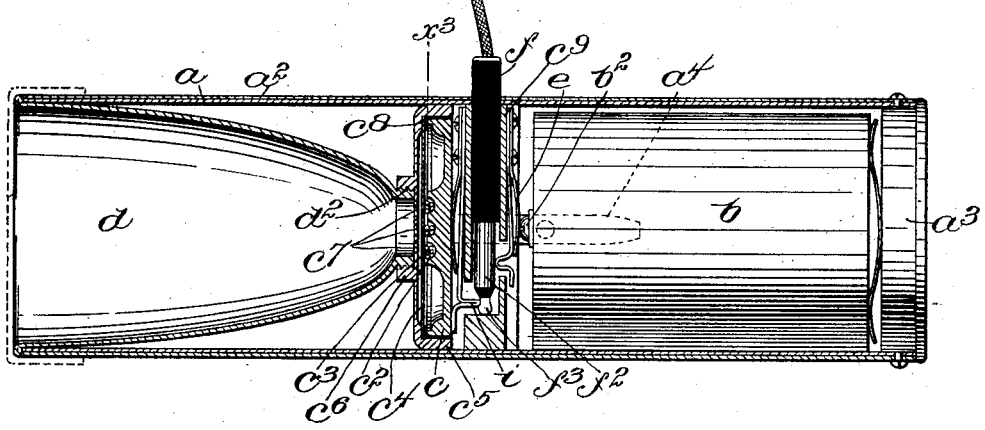

Figure 1 is a longitudinal section through the instrument, both receiver and transmitter, the cord connection being broken. Fig. 2 is a section through the receiver on line $x^2$, Fig. 1, to illustrate the switch employed therein. Fig. 3 is a transverse section of the lower part of Fig. 1 on the line $x^3$, and Fig. 4 is a plan view of the receiver part with the casing shown in section. In the drawings the receiver is drawn full size and the cylindrical part, which contains the transmitter, about two-thirds its size.

The instrument embodying the invention comprises the cylindrical casing, which is shown as formed of a metallic shell $a$, with a covering $a^2$, of leather or other suitable material, the said shell containing at one end a dry battery $b$, which may be of any suitable commercial type, being herein shown conventionally without attempt at technical illustration. The casing $a$ also contains a transmitter, which consists of a carbon conducting portion $c$, provided with recesses $c^2$, which contain pellets of carbon $c^3$, which when the instrument is in the position shown are piled up against the diaphragm $c^4$, which is preferably a carbon disk held in place by the metallic shell $c^5$. The casing $a$ $a^2$ also contains a sound-collector or megaphone $d$, the mouth of which is substantially equal in diameter to the diameter of the casing, while the walls converge toward the diaphragm $c^4$, the said sound-collector being shown as made of metal and screw-threaded at its inner end, as indicated at $d^2$, and thereby fastened to the shell $c^5$, which is provided with an internally-threaded projecting portion $c^6$. In order to protect the diaphragm $c^4$, the shell $c^5$ is extended across the face of the diaphragm and provided with openings $c^7$ in front of the diaphragm to permit the action of the sound thereon, and the diaphragm is separated from the conducting portion $c$ by an insulating-strap $c^8$, so that the electrical connection is through the pellets only.

The battery $b$ is cylindrical in shape and fits closely within the shell or casing $a\ a^2$, being maintained in place by means of a removable cover $a^3$, provided with a spring which rests against the rear end of the battery to hold the same in position. One terminal of the battery is shown as a metallic projection $b^2$ from the inner end of the battery, which rests against a contact-spring $e$, arranged to engage the member $f^2$ of the switch-plug $f$, which contains the terminals of the cord connection $g$, leading to the receiver $h$. The other terminal of the battery consists of the outer metallic surface thereof, which rests against a contact-spring $a^4$. The other member, $f^3$, of the plug $f$ engages a contact-spring $i$, which is forced by the plug into engagement with the carbon-conducting member $c$ of the transmitter. The two conductors $g^2$ and $g^3$ of the cord $g$ pass through the receiver, the conductor $g^2$ being shown as wound upon the magnet-cores $g^4$, which influence the diaphragm $g^5$, the said conductor being connected with the metallic casing $g^6$, while the conductor $g^3$ is connected with a switch contact-spring $g^7$, which normally lies in engagement with a switch-slide $g^8$ in contact with the metallic casing $g^6$. Normally, therefore, when the switch-plug $f$ is inserted the current travels from one terminal of the battery $b$ through the spring-contact $a^4$ to the metallic shell $c^5$ of the transmitter and thence through the diaphragm $c^4$, which is separated from the part $c$ by the insulating-ring $c^8$, through the carbon pellets $c^3$ to the part $c$, which is connected by means of the spring-contact $i$ with the conductor $g^2$. The current then passes through the receiver $h$ and back to the contact-spring $e$ and to the battery through the terminal $b^2$, thus completing the circuit. Thus while the plug $f$ is in place the battery-current is continually flowing, and any vibrations of the diaphragm $c^4$ produced by sound will, through the action of the loose pellets $c^3$, produce a wide variation in the current, thus setting up a proportionally greater vibration of the receiver-diaphragm $g^5$, reproducing and largely magnifying the sound which has already been concentrated or focused by the megaphone attachment $d$.

The insulating-strip $c^8$ is of a thickness less than the diameter of the pellets $c^3$, so that while the said pellets are confined in the recesses $c^2$, which contain them, they are free to move with great sensitiveness in response to the vibrations of the diaphragm, thereby producing a considerable variation in the current.

The transmitter described above is herein shown as connected with a supporting member $c^9$, which is preferably a cylindrical block of wood fitting closely in the casing $a$, the said block also affording a support for the contact-springs $e$ and $i$ and a socket for the plug $f$.

The metallic shell $c^5$ for the transmitter is fastened to the wooden member $c^9$ by means of screws $c^{10}$, (shown in Fig. 4,) the contact-spring $a^4$ being incidentally used to connect the conducting portion $c^5$ of the transmitter with the portion $c^9$, the screw $c^{10}$ passing through the said spring. The lower screw $c^{10}$ passes through an extension from the metallic shell, so that the part $c^5$ is securely connected to the part $c^9$.

The casing $a$ is provided with a suitable opening in its wall in alinement with the socket for the plug, the parts being positioned by the megaphone attachment $d$, which, as clearly shown in Fig. 1, has a flange which fits over and engages the end of the casing $a$.

If the instrument is temporarily out of use and it is not convenient to disconnect the plug $f$, the battery-circuit can be opened in order to save the energy of the battery by the use of the switch member $g^8$, which, as previously described, comprises a slide mounted in the receiver-shell. The said slide carries an insulating-strip $g^9$, which when the slide is pushed in one direction (downward, as shown in Fig. 1) comes in contact with the spring $g^7$, thus breaking the transmitter-circuit and stopping the flow of battery-current. This expedient is not intended for permanent use, since when the instrument is out of use the receiver will normally be disconnected by taking out the plug $f$, and for convenience in transportation the receiver can be carried in the megaphone portion of the instrument, which is large enough to hold the receiver and the plug and cord circuit. In this connection attention is called to the fact that, as previously stated, the cylindrical body portion of the instrument is shown on a reduced scale.

The instrument is further provided with a cover for the megaphone end, (herein shown in dotted lines,) so that with a handle attached the whole device can be readily carried and at the same time easily arranged for use by simply taking off the cover and plugging in the receiver.

I claim—

1. A sound collecting and magnifying device comprising a casing containing a sound-collector, a transmitter and a battery; combined with a receiver having a cord-circuit and a plug-terminal; and contact members in the casing to connect the battery-circuit through the transmitter and receiver when the said plug is in place, substantially as described.

2. In a sound collecting and magnifying instrument, the combination with a casing containing a battery, a megaphone sound-collector and a diaphragm subjected to the action of the sound collected; of a contact member insulated from said diaphragm and separated therefrom by a space and provided with a plurality of recesses containing carbon pellets slightly larger in diameter than the distance between said diaphragm and said contacting member; means for connecting one terminal of said battery with said diaphragm and the other terminal with said contact member; and a receiver included in the battery-circuit, substantially as described.

3. In a sound collecting and magnifying device, a metallic casing containing a dry battery, the side of which constitutes one terminal, while the end of said battery is provided with a metallic contact member constituting the other terminal; a transmitter within said casing having one of its members provided with a contact-spring adapted to come in contact with one terminal of said battery, and its other member with a contact-spring; a receiver provided with a cord-circuit terminating in a plug having terminal members for the circuit-conductors insulated from each other; a socket in said casing for said plug, one member of which engages the contact-spring aforesaid when the plug is in position; and a second contact-spring engaging the other member of the plug and the other terminal of the battery, substantially as described.

4. A sound collecting and magnifying device, comprising a casing containing a sound-collector, a transmitter and a battery; combined with a receiver having a cord-circuit and a plug-terminal; contact members in the casing to connect the battery-circuit through the transmitter and receiver when the said plug is in place; and a switch connected with the receiver for controlling the battery-circuit, substantially as described.

In testimony whereof I have signed my name to this specification in the presence of two subscribing witnesses.

CHARLES H. VIGGARS.

Witnesses:
NANCY P. FORD,
H. J. LIVERMORE.